United States Patent Office 3,487,098
Patented Dec. 30, 1969

3,487,098
SULFONE-CONTAINING ORGANOCYCLOTRI-
SILOXANES
Tse C. Wu, Waterford, N.Y., assignor to General Electric
Company, a corporation of New York
No Drawing. Filed Dec. 15, 1966, Ser. No. 601,877
Int. Cl. C07d 103/04
U.S. Cl. 260—448.2                              6 Claims

ABSTRACT OF THE DISCLOSURE

A sulfone-containing organocyclotrisiloxane, more particularly, such a cyclotrisiloxane having the structure:

(1) 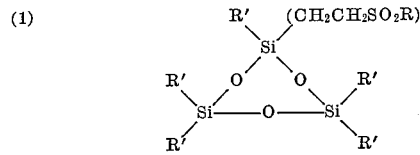

where R is selected from the class consisting of methyl, ethyl, phenyl, and tolyl; and each R' is individually selected from the class consisting of alkyl groups, aryl groups, and sulfone groups of formula —$CH_2CH_2SO_2R$, where R is as previously defined. A method of forming the sulfone-containing organocyclotrisiloxanes of Formula 1 by oxidation of a corresponding mercapto-containing organocyclotrisiloxane with monoperphthalic acid. The novel compounds of the invention can be homopolymerized or copolymerized to high molecular weight gums which are resistant to solvent swelling.

BACKGROUND OF THE INVENTION

High molecular weight, sulfone-containing organopolysiloxanes have previously been described in U.S. Patent No. 2,997,457, Kantor. Additionally, a method for forming these high molecular weight materials was shown which involved the polymerization of lower molecular weight fluids having sulfone substituents. While the method for forming the high molecular materials described in the aforementioned patent are adequate for most purposes, it has previously been found in the art of forming high molecular weight organopolysiloxanes that the use of cyclopolysiloxanes containing the desired substituents is advantageous. Exemplary of the cyclopolysiloxanes which have proven invaluable in forming high molecular weight, organopolysiloxane gums are octamethylcyclotetrasiloxane and hexaphenylcyclotrisiloxane. In general, the cyclic polysiloxanes are valuable because they can be made in a higher state of purity than low molecular weight, fluid polysiloxanes. It is, therefore, an object of this invention to provide cyclic polysiloxanes, of sufficient purity for use in forming high molecular weight polymers, the cyclic polysiloxanes being substituted with sulfone groups, as described in Formula 1.

The prior art methods of forming sulfone groups proved unsuccessful when applied to the production of the cyclic materials of Formula 1. For example, when 2-methyl-2-$\beta$-methylmercaptoethyl - 4,4,6,6 - tetraphenylcyclotrisiloxane was oxidized with hydrogen peroxide in glacial acetic acid, or in an aqueous medium containing tungstic acid, the ring of the cyclotrisiloxane cleaved and the resulting sulfone-containing material was a low molecular weight polysiloxane, rather than the desired cyclotrisiloxane. Similarly, when 2,4,6,8-tetramethyl-2,4,6,8-tetrakis($\beta$ - methylmercaptoethyl)cyclotetrasiloxane was oxidized by hydrogen peroxide in acetic acid, none of the desired 2,4,6,8-tetramethyl-2,4,6,8-tetrakis($\beta$ - methylsulfonylethyl)cyclotetrasiloxane could be isolated.

An attempt was also made to form the desired cyclotrisiloxane by treatment of 2-chloromethyl-2-methyl-4,4,6,6-tetraphenylcyclotrisiloxane with methanesulfonylmethylmagnesium bromide in anisole, but no sulfone-containing cyclotrisiloxane was obtained. Similarly, none of the desired cyclotrisiloxane was obtained when 2-$\beta$-chloroethyl - 2 - methyl-4,4,6,6-tetraphenylcyclotrisiloxane was treated with sodium benzenesulfinate in ethanol.

BRIEF SUMMARY OF THE INVENTION

Two routes of synthesis for forming the cyclotrisiloxanes of the present invention have been discovered. The first involves the condensation of the sulfone-containing organodichlorosilane described and claimed in my copending application Ser. No. 601,876, filed of even date herewith and assigned to the same assignee as the present invention, of formula:

(2)     $(RSO_2CH_2CH_2)_aSiR''_{2-a}Cl_2$ where R is as previously defined, R'' is a monovalent organic group selected from the class consisting of methyl, ethyl, phenyl, and tolyl, and $a$ is from 1 to 2; with a sym-tetraorganodisiloxanediol of formula:

(3)     $HOSiR'_2OR'_2SiOH$ where R' is as previously defined. The alkyl or aryl group which R' represents in Formulas 1 and 3 is preferably methyl or phenyl, but can be other alkyl or aryl groups, such as, for example, ethyl, propyl, octyl, dodecyl, octadecyl, naphthyl, tolyl, ethylphenyl, etc.

The second method of synthesizing the cyclotrisiloxanes of the present invention, as shown in Formula 1, involves the oxidation of a mercapto-containing cyclotrisiloxane with monoperphthalic acid, in an ether solution, according to the following equation:

(4) 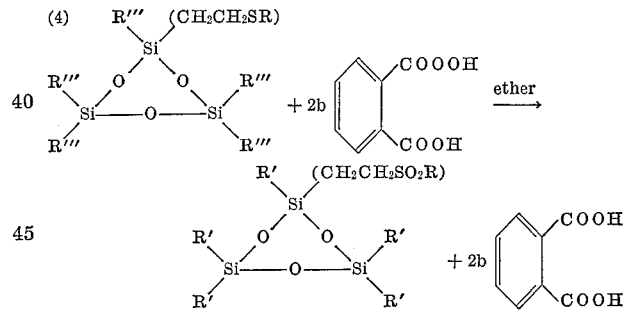

where each R''' is individually selected from the class consisting of alkyl groups, aryl groups, and $\beta$-organomercaptoethyl groups of formula $+CH_2CH_2SR)$, R and R' are as previously defined, and $b$ is the number of $\beta$-organomercaptoethyl groups on the cyclotrisiloxane to be treated.

DETAILED DESCRIPTION OF THE INVENTION

The condensation reaction between the sulfone-containing dichlorosilane of Formula 2 and the sym-tetraorganodisiloxanediol of Formula 3 to form the desired cyclotrisiloxane can be represented by the following equation:

(5)
$(RSO_2CH_2CH_2)_aSiR''_{2-a}Cl_2 + HOSiR'_2OR'_2SiOH \longrightarrow$

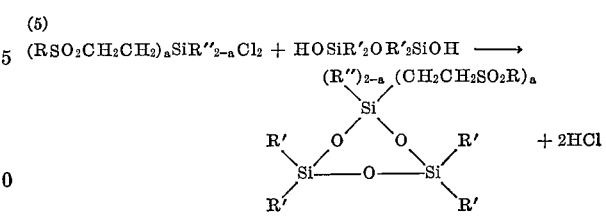

The compounds of Formulas 2 and 3 should preferably be reacted in the stoichiometric ratio of 1:1. However, either of the components can be present in an amount of 5 percent in excess of this stoichiometric ratio. Preferably, if one of the components is to be employed in excess, it should be the material of Formula 3, when this compound is not substituted with sulfone groups, because of the greater expense of producing the sulfone-containing dichlorosilane of Formula 2.

The reaction should be run in the presence of a solvent, and more preferably, in dilute solution. Since it is possible for the combination of compounds (2) and (3) to form either cyclopolysiloxanes or straight-chain organopolysiloxanes, the conditions must be established to favor formation of the cyclics. The more dilute the solution, the more the formation of the cyclics is favored. Thus, the final concentration should be limited to no more than about 2 moles of total reactant per liter of solvent, preferably no more than 0.5 mole of total reactant per liter of solvent. The reaction is preferably accomplished by dissolving the compound of Formula 2 in a portion of the solvent, the compound of Formula 3 in a separate portion, and adding the two solutions simultaneously to a third portion of the solvent.

The solvents which can be utilized are essentially any organic solvents which are inert to the reactants under the conditions of the reaction. However, the preferred solvents are the hydrocarbons, such as benzene, toluene, xylene, pentane, hexane, heptane, etc. Any of the utilizable solvents can be mixed, that is, one solvent may be used for one of the reactants and a different solvent for the other reactant, or a mixture of the solvents for a particular reactant.

Preferably, the reactant solutions are added simultaneously to the reaction vessel, so as to keep the concentration of reactants as low as possible. An acid acceptor is generally placed in the portion of the solvent to which the reactants are added. The acid acceptor which should be utilized can be selected from any of the well-known weak bases which are used as acid acceptors in similar reactions. For example, the tertiary amines, such as pyridine, picoline, 1,4-diazobicyclo(2,2,2)octane and the dialkyl anilines can be utilized. The acid acceptor adsorbs the generated hydrogen chloride in a molar ratio of 1:1. Thus, there must be at least one mole of acid acceptor used for each mole of hydrogen chloride produced. Preferably, the acid acceptor is present in an amount at least 50 percent in excess of the stoichiometric requirement and can be present in an excess of several hundred percent.

The reaction can be accomplished at any temperature between about 10° C. and the reflux temperature of the reaction mixture. Preferably, the reaction is run at room temperature for convenience and because the reaction is accomplished so quickly, even at room temperature.

The reactants are added slowly to prevent too great a concentration in solution. The addition should be completed over a period of time of no less than one-half hour. There is no maximum addition time, except as limited by economics. Following addition, the reaction mixture is stirred for two or more hours to assure completion of the reaction.

After the reaction is completed, the reaction mixture is filtered to remove the formed salt, the solvent is removed by evaporation and the resultant compound is further purified. Purification is preferably accomplished by recrystallization employing such materials as cyclohexane, hexane, or heptane.

The oxidation of the mercapto-containing organocyclotrisiloxane to the sulfone-containing cyclic material, according to Equation 5 is also carried out in a solvent solution. Preferably, the mercapto-containing cyclotrisiloxane is dissolved in anhydrous ethyl ether in an amount of from about 0.1 to 0.5 mole per liter and the monoperphthalic acid is dissolved in a separate portion of the anhydrous ether, in a similar concentration. The monoperphthalic acid-ether solution is cooled to about 0° C. and the mercapto-containing cyclotrisiloxane solution is added to it. The reaction is exothermic in nature and the temperature of the reaction mixture can be allowed to rise to about 20° C. The rate of addition of the mercapto-containing cyclotrisiloxane is regulated so as to control the temperature of the reaction mixture. Following addition, the reaction mixture is not further treated for from about 2 to 5 hours. A material such as tributylphosphine may be added to neutralize any unreacted monoperphthalic acid. The reaction mixture is then filtered to remove the solid phthalic acid which is generated in the reaction and the ether is evaporated. The residue is extracted with a polar solvent, such as ethyl acetate, and is then refiltered to remove additional solid phthalic acid. The extraction solvent is evaporated and the residue is recrystallized with a hydrocarbon material such as cyclohexane, hexane, or heptane to recover the purified sulfone-containing cyclotrisiloxane of Formula 1.

As the monoperphthalic acid is unstable, it must either be prepared just prior to use or must be stored at near 0° C. The preferable method, when forming the desired cyclotrisiloxane according to the reaction of Equation 5 is to form the acid just prior to use. It can be formed by the reaction of phthalic anhydride and sodium perborate, in water, as described, for example, in Fieser and Fieser, Advanced Organic Chemistry, Reinhold Publishing Corp., 1961, at page 195.

The formation of the cyclopolysiloxanes of the present invention will now be described in greater detail. These examples should be considered as illustrative only, and not as limiting in any way the full scope of the invention as covered in the appended calims. All parts in the following examples are by weight.

Example 1

This example illustrates the preparation of pentamethyl-β-methylsulfonylethylcyclotrisiloxane by the condensation reaction of Equation 4. A solution consisting of 27.5 parts of pyridine in 700 parts of benzene was placed in a reaction vessel equipped with a stirrer and two addition vessels. A second solution was prepared consisting of 58.2 parts of tetramethyldisiloxane-1,3-diol and 38 parts of pyridine dissolved in about 325 parts of benzene and was placed in one of the addition vessels. A third solution was prepared, of equal volume with the second, consisting of 77.4 parts of methyl-β-methylsulfonylethyldichlorosilane in benzene and was placed in the second addition vessel. The second and third solutions were added, simultaneously, with vigorous stirring, to the solution in the reaction vessel over a period of 1 hour, at room temperature. The reaction mixture was stirred for an additional 5 hours and was then filtered to remove the pyridine hydrochloride salt which formed. The benzene solvent was evaporated from the filtrate to yield a gummy residue. The residue was dissolved in a mixture of 1,050 parts of ethyl ether and 1,000 parts of water and an aqueous layer and an ether layer resulted. The two layers were separated and the aqueous layer was extracted with ether. The two ether solutions were combined, washed with water, dried over sodium sulfate, and filtered. The filtrate was distilled to yield 96.9 parts of a product having the formula:

(6) 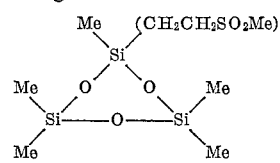

where Me is methyl, which corresponds to the material of Formula 1 where R is methyl and each R' is methyl. This represented an 88 percent yield, based on the theoretical, of the product. The product had a melting point of 108–113° C. The crude product was recrystallized several times from a benzene-hexane mixture and was vacuum sublimed to yield 50.6 parts, a 46 percent yield based upon the theoretical, of white, fluffy needles, melting at 116–117° C. The structure of the material was substantiated by an infrared spectrum.

Example 2

This example illustrates the preparation of pentamethyl-β-methylsulfonylethylcyclotrisiloxane, as illustrated in Formula 6, by the oxidation reaction of Equation 4. A solution of 73 parts of monoperphthalic acid in 540 parts of ethyl ether was placed in a reaction vessel equipped with an addition vessel, a condenser, and a stirrer. The solution was cooled to 0° C. and a quantity of 56.5 parts of pentamethyl-β-methylmercaptoethylcyclotrisiloxane was added, slowly, with stirring. After about one-half of the cyclotrisiloxane had been added, external cooling was removed, and the reaction mixture slowly warmed to room temperature. The remaining mercapto-containing cyclotrisiloxane was then added, the total time elapsing for the addition of the cyclotrisiloxane being about 1 hour. The reaction mixture was allowed to stand for several hours and a quantity of 3 parts of tributylphosphine was added to destroy any remaining monoperphthalic acid. The reaction mixture was then filtered to remove the generated solids and the ether was evaporated from the filtrate. The resulting residue was extracted with ethyl acetate and newly-formed, solid phthalic acid was removed by filtration. The ethyl acetate was evaporated and the residue was recrystallized three times from hexane to yield 14 parts, a 23 percent yield, based upon the theoretical, of shiny, fluffy needles, identical in structure with the material of Formula 6. The structure of this material was again substantiated by an infrared spectrum.

Example 3

This example illustrates the preparation of 2-methyl-2-β-methylsulfonylethyl-4,4,6,6-tetraphenylcyclotrisiloxane by the reaction of Equation 4. A solution was formed in a reaction vessel as described for Example 2, consisting of 7 parts of monoperphthalic acid dissolved in 110 parts of anhydrous ethyl ether. The solution was cooled to a temperature of 0° C. A second solution was formed containing 10.6 parts of 2-methyl-2-β-methylmercaptoethyl-4,4,6,6-tetraphenylcyclotrisiloxane in 70 parts of ether. The second solution was added to the first over a period of 30 minutes and the temperature of the reaction mixture gradually rose from 0° C. to 15° C. during the course of the addition. The reaction mixture was then allowed to warm to room temperature, while stirring for a period of about 3 hours. The resulting phthalic acid solids were removed by filtration and the ether was evaporated from the filtrate. The residue was extracted with ethyl acetate, the solution filtered to remove additional solids, and the ethyl acetate evaporated. The residue was recrystallized three times from cyclohexane to yield 2.5 parts, a 22 percent yield based on the theoretical, of a product having the formula:

(7)

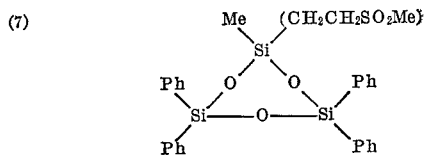

where Me is methyl and Ph is phenyl, which corresponds to the product of Formula 1 where R is methyl, the R' substituent on the same silicon atom is methyl, and each of the other R' substituents is phenyl. The material had a melting point of 127.5–129° C. and its structure was substantiated by an infrared spectrum.

Example 4

Employing the general reaction conditions of Example 1, the following product is formed:

(8)

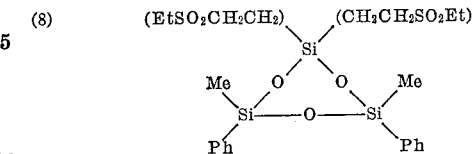

where Me is methyl, Et is ethyl, and Ph is phenyl. This corresponds to Formula 1 where R is ethyl, the R' on the corresponding silicon atom is β-methylsulfonylethyl, one R' on each of the other silicon atoms is methyl and the other R' substituents are phenyl.

Example 5

Employing the general reaction procedures of Example 1, the following sulfone-containing organocyclotrisiloxane is produced:

(9)

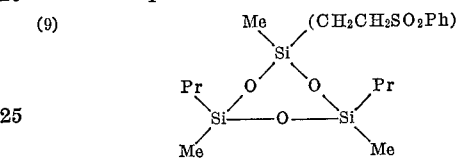

where Me is methyl, Ph is phenyl and Pr is propyl. This corresponds to the product of Formula 1 where R is phenyl, one R' on each silicon atom is methyl, and the remaining R' substituents are propyl.

Example 6

Employing the general reaction procedures of Example 2, the following sulfone-containing organocyclotrisiloxane is produced:

(10)

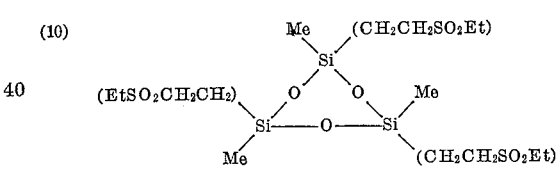

where Me is methyl and Et is ethyl. This corresponds to the material of Formula 1 where R is ethyl, one R' on each of the remaining silicon atoms is β-ethylsulfonylethyl, and the remaining R' substituents are methyl.

Example 7

Employing the general procedure of Example 2, the following sulfone-containing organocyclotrisiloxane is produced:

(11)

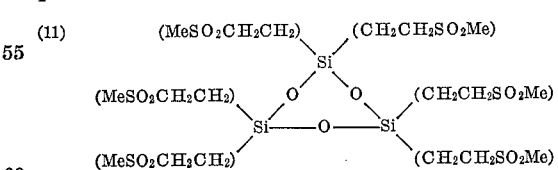

where Me is methyl. This corresponds to the material of Formula 1 where R is methyl and each R' substituent is β-methylsulfonylethyl.

Example 8

Employing the general procedures of Example 2, the following sulfone-containing organocyclotrisiloxane is produced:

(12)

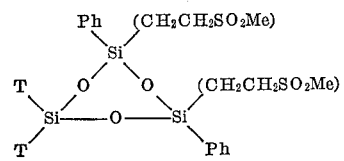

where Me is methyl, Ph is phenyl, and T is tolyl. This corresponds to the material of Formula 1 where R is methyl, one R' substituent on a second silicon atom is β-methylsulfonylethyl, the R' substituents on the sulfone-substituted silicon atoms are phenyl, and the two remaining R' substitutents in the cyclic polymer are tolyl.

The sulfone-containing organocyclotrisiloxanes of the present invention can be homopolymerized or copolymerized to high molecular weight gums which are resistant to solvent swelling. The high molecular weight gums which are obtainable from these cyclotrisiloxanes include those having intrinsic viscosities of up to about 1.5 dl./g. The tensile strengths of films formed from the gums range up to about 1,000 p.s.i. at elongations of about 400 percent. Additionally, the materials are heat stable, the weight loss being only 6.7 percent when heated for 1 week at 200° C. Further, the materials retain their flexibility even after heating for 1 week at 250° C.

Pentamethyl - β - methylsulfonylethylcyclotrisiloxane was polymerized in the presence of a basic catalyst, and, in a variety of polymerizations, rubbery gums were formed with intrinsic viscosities of from 0.3 to 0.6 dl./g. These polymers could be milled and cured to form rubber having good resistance to hydrocarbon solvents and oils. Among the catalysts employed for polymerizing the cyclotrisiloxane were potassium hydroxide and potassium naphthalene. Polymerization, employing the catalyst in amounts from 10 to 270 parts per million, as potassium hydroxide based on the cyclotrisiloxane, progressed sufficiently to stop the stirrer in a heated bath of the polymer in less than 5 seconds.

The following examples illustrate the use of the sulfone-containing cyclotrisiloxanes of the present invention is forming high molecular weight sulfone-containing organopolysiloxanes.

Example 9

A quantity of 300 parts of pentamethyl-β-methylsulfonylethylcyclotrisiloxane and 9 parts of 2 - methyl-2-vinyl-4,4,6,6 - tetraphenylcyclotrisiloxane were dissolved in 130 parts of toluene and the solution was heated to 120° C., while stirring. A quantity of potassium hydroxide suspended in octamethylcyclotetrasiloxane, in an amount of 200 p.p.m. of potassium hydroxide, based upon the total cyclopolysiloxane present, was added to the solution. The polymerization progressed to such a degree that the stirrer was stopped after 1.3 seconds, due to the increase in viscosity. Heating was continued for an additional 5 minutes and the solvent and other volatile materials were then removed, under vacuum. Heating was continued, under vacuum, at 120° C. for an additional 2 hours. The polymer was then cooled to room temperature, dissolved is ethyl acetate, and decatalyzed with a small portion of methyl iodide. The polymer was precipitated from the solution by the addition of hexane. The reprecipitated polymer was dissolved in ethyl acetate, reprecipitated once again in hexane, and dried in a vacuum oven. A portion of the formed polymer was dissolved in ethyl acetate and found to have as intrinsic viscosity of 1.25 dl./g.

Example 10

Employing the same general conditions as in Example 9, 2 parts of pentamethyl-β-methylsulfonylethylcyclotrisiloxane was copolymerized with 1 part of hexamethylcyclotrisiloxane yielding a copolymer with an intrinsic viscosity of 1.42 dl./g. This copolymer was converted to a rubber by milling in, for each 100 parts of the copolymer, 40 parts of silica filler, 5 parts of process aid, and 0.8 part of dicumyl peroxide, and curing. A portion of the formed rubber sheet was tested and found to have a tensile strength of 450 p.s.i. at 245 percent elongation.

Example 11

Employing the same reaction conditions as in Example 9, equimolar amounts of pentamethyl - β - methyl- sulfonylethylcyclotrisiloxane and hexamethylcyclotrisiloxane were copolymerized to yield a copolymer with an intrinsic viscosity of 1.35 dl./g. The copolymer was converted to a rubber in the same manner as in the previous example and a portion of this rubber showed a tensile strength of 905 p.s.i. with an elongation of 220 percent.

Example 12

Employing the same conditions as in Example 9, pentamethyl - β - methylsulfonylethylcyclotrisiloxane was copolymerized with 6 percent, by weight, of 2-methyl-2-vinyl - 4,4,6,6 - tetraphenylcyclotrisiloxane, to form a copolymer with an intrinsic viscosity of 0.90 dl./g. The copolymer was converted to a rubber, in the same manner as Example 10 and a portion of this rubber sheet was found to have a tensile strength of 460 p.s.i. at 215 percent elongation. The sheet was heated at 200° C. for 24 hours and showed a tensile strength of 360 p.s.i. at 200 percent elongation. When immersed in toluene, the rubber formed in this example, was found to swell only 40 percent, by weight.

Thus a valuable intermediate for the formation of sulfone-containing, high molecular weight organopolysiloxanes has been shown.

What I claim as new and desire to secure by Letters Patent of the United States is:

1. A cyclopolysiloxane having the formula:

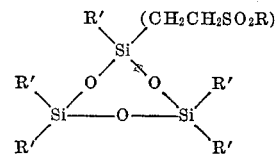

where R is selected from the class consisting of methyl, ethyl, phenyl, and tolyl; and each R' is selected from the class consisting of monovalent alkyl groups, monovalent aryl groups, and β-organosulfonylethyl groups of formula —CH$_2$CH$_2$SO$_2$R, where R is as previously defined.

2. The cyclopolysiloxane of claim 1 having the formula:

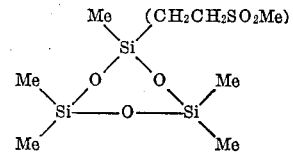

where Me is methyl.

3. The cyclopolysiloxane of claim 1 having the formula:

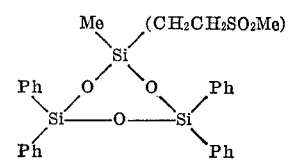

where Me is methyl and Ph is phenyl.

4. A method for forming a sulfone-containing cyclotrisiloxane of the formula:

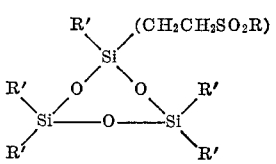

where R is selected from the class consisting of methyl, ethyl, phenyl, and tolyl; and each R' is selected from the class consisting of monovalent alkyl groups, monovalent aryl groups, and β-organosulfonylethyl groups of formula —CH$_2$CH$_2$SO$_2$R, where R is as previously defined, comprising forming a mercapto-containing cyclotrisiloxane of formula:

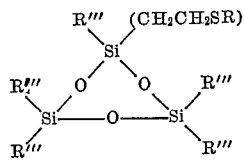

where R is as previously defined and R''' is selected from the class consisting of monovalent alkyl groups, monovalent aryl groups, and β-organomercaptoethyl groups of formula —CH$_2$CH$_2$SR; and treating said mercapto-containing cyclotrisiloxane with monoperphthalic acid, in the ratio of 2 moles of monoperphthalic acid for each β-organomercaptoethyl group.

5. The process of claim 4 wherein pentamethyl-β-mercaptoethylcyclotrisiloxane is treated with monoperphthalic acid to form pentamethyl-β-sulfonylethylcyclotrisiloxane.

6. The process of claim 4 wherein 2-methyl-2-(β-methylmercaptoethyl) - 4,4,6,6 - tetraphenylcyclotrisiloxane is treated with monoperphthalic acid to form 2-methyl-2-(β-methylsulfonylethyl) - 4,4,6,6 - tetraphenylcyclotrisiloxane.

References Cited

UNITED STATES PATENTS

| | | | |
|---|---|---|---|
| 2,719,165 | 9/1955 | Cooper | 260—448.2 |
| 2,833,801 | 5/1958 | Holbrook | 260—448.2 |
| 2,835,690 | 5/1958 | Prober | 260—448.2 |
| 2,997,457 | 8/1961 | Kantor | 260—448.2 XR |

OTHER REFERENCES

Fuson: "Reactions of Organic Compounds," Wiley & Sons, Inc. (1962), New York, p. 246.

DELBERT E. GANTZ, Primary Examiner

P. F. SHAVER, Assistant Examiner

U.S. Cl. X.R.

260—37, 46.5